United States Patent [19]

Leu

[11] Patent Number: 4,918,775
[45] Date of Patent: Apr. 24, 1990

[54] PORTABLE SAFETY DEVICE COMBINATION FOR OUTDOOR USE

[76] Inventor: Ching-Baiu Leu, 6F-1, No. 283, An-Ho Road, Taipei, Taiwan

[21] Appl. No.: 288,956

[22] Filed: Dec. 21, 1988

[51] Int. Cl.$^5$ .............................................. B25F 1/04
[52] U.S. Cl. ........................................ 7/168; 7/164; 7/170; 7/158; 7/151; 362/119
[58] Field of Search ................... 7/170, 167, 168, 164, 7/158, 151; 362/109, 116, 119, 120; 350/243, 250, 453, 546; 354/219

[56] References Cited

U.S. PATENT DOCUMENTS

| | | | |
|---|---|---|---|
| 1,104,644 | 7/1914 | Faehrmann | 350/243 |
| 1,187,842 | 6/1916 | Kaas | 7/168 |
| 2,371,308 | 3/1945 | Mosch | 362/116 |
| 4,016,580 | 4/1977 | Finelli | 354/219 |
| 4,314,316 | 2/1982 | Gertler et al. | 362/109 |
| 4,449,474 | 5/1984 | Mariol | 362/116 |
| 4,486,079 | 2/1984 | Ueda | 350/250 |
| 4,723,140 | 2/1988 | Whiteside et al. | 354/219 |

FOREIGN PATENT DOCUMENTS 1205761  11/1965  Fed. Rep. of Germany ........... 7/170

Primary Examiner—Roscoe V. Parker
Attorney, Agent, or Firm—Bernard R. Gans

[57] ABSTRACT

A portable safety device for outdoor use comprising: a first shell and a second shell; two grooves respectively disposed in the first and second shells; a switch disposed on the first shell and exposed to the outer environment of the first shell; first and second conductive plates disposed on the first shell and electrically communicated with each other by the switch; a cylindrically lighting means disposed between the first and second sheels and one end thereof protruded from the combination of the first and second shells; fixing means disposed on the other end of the combination of the first and second shells for connecting the lighting means, and the first and second shells together; a telescope movably disposed upon the lighting means and having an open position and a closed position wherein at one end thereof is an object lens and at the other end is an eye lens; a slidably elongated means provided on the object lens of the telescope for slidably moving the telescope from the closed position to the open position and two ends thereof respectively sliding on the grooves of the first and second shells; engaging means disposed on one end of the telescope for connecting said telescope with the first and second shells; and a T-shaped block disposed near the other end of the telescope for controlling the movement of the telescope from the closed position to the open position.

9 Claims, 3 Drawing Sheets

PORTABLE SAFETY DEVICE COMBINATION FOR OUTDOOR USE

BACKGROUND OF THE INVENTION

The present invention pertains to a portable safety device for outdoor use. Particularly, this invention relates to a portable safety device comprising various tools.

Recently, outdoor activity is very common and always results in accidents. Thus, how to avoid or prevent such accidents from happening also becomes very important. In the usual outdoor activities, individual tools, such as a flashlight, compass, knife, fork, bottle opener, magnifying glass, telescope, whistle, etc., have to be well-prepared before departure and kept in an appropriate place in order to be accessible if needed. However, to separately keep these tools is obviously inconvenient for the user. Because the user must separately keep the tools, the location of the tools may be forgotten.

SUMMARY OF THE INVENTION

It is therefore a primary object of the present invention to overcome the foregoing and other disadvantages of a conventional tool.

A further object of the present invention is to provide a portable safety device for outdoor use, which is lightweight and simple to construct.

A further object of the present invention is to provide a portable safety device for outdoor use which is easily assembled and disassembled and may be produced at a very low cost.

Yet another object of the present invention is to provide a portable safety device which possesses the functions of individual tools.

These, and other objects and advantages of the present invention will become more apparent from a consideration of the following detailed description of the preferred embodiments, when read in conjunction with the accompanying drawings.

DETAILED DESCRIPTION OF THE PREFERRED EMBODIMENT

Figure 1:
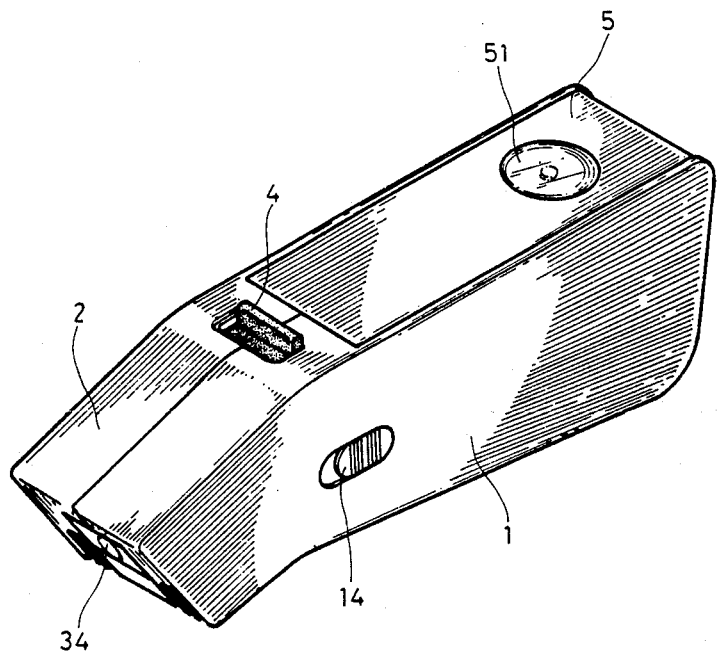
FIG. 1 is a perspective view of a portable safety device in accordance with the subject of the present invention.
Figure 2:
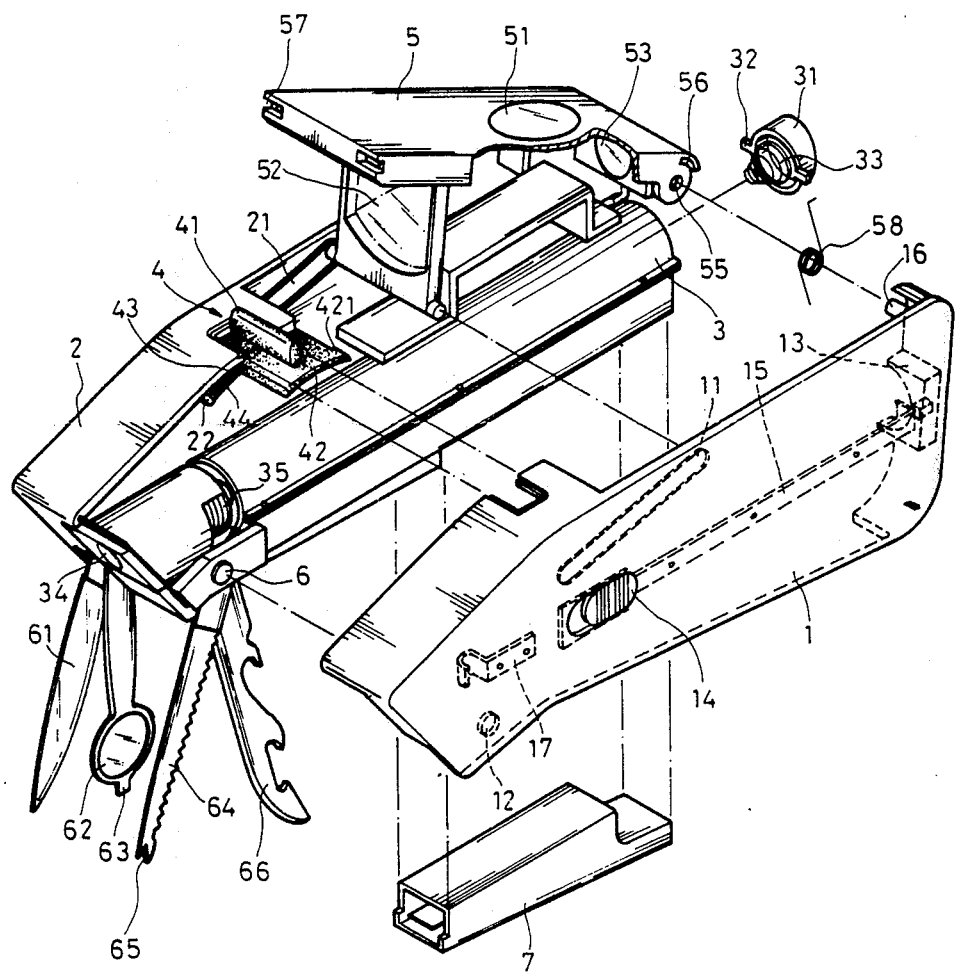
FIG. 2 is an exploded view of a portable safety device in accordance with the subject of the present invention.

Referring to FIGS. 1 and 2, a preferred embodiment of the portable safety device of the present invention is illustrated. The present device comprises a first shell (1) and a second shell (2). A cylindrical structure (3) is formed between the combination of the first and second shells in which the top portion thereof is capped with a cover (5). One end of the cylindrical structure (3) protrudes from the combination. The two shells (1, 2) are substantially symmetrical. The interior portion of the shells (1, 2) are provided with slanting grooves (11, 21), a notch (12) and a pivot (16). A fixing seat (13) is disposed on the rear end of the first shell (1) and the interior of the first shell (1) is provided with a first transverse conductive plate (15) and a second conductive plate (17). A switch (14) electrically communicates with the first transverse conductive plate (15) and the second conductive plate (17) in order to control the communication between the two plates (15, 17).

The cylindrical structure (3) is hollow which is adapted for bulbs and batteries. A bottom plate (31) seals the end of the structure (3). A peg (32) is provided at the lateral edge of the plate (31) in order to engage with the fixing seat (13) or the first and second shells (1, 2). A conductive spring (33) provided within the bottom plate (31) urges the batteries to contact closely and in communication with the conductive plate (15). The front end of the cylindrical structure (3) is provided with an opening for light section (34) and the front lateral side thereof is provided with contacting section 35 which can be contacted with a conductive plate (17). A T-shaped block (4) is provided within an enclosed rectangular space, with a protruded section (41) extending upward and a front center region of a transverse section (42) being a protrusion (43) which can be connected with one end of a spring (44). The other end of the spring (44) is inserted into a peg (22), thereby a biasing force is provided so that the T-shaped block is biased backward.

A compass (51) is provided on the top portion of the cover (5). Two engaging holes (55) are provided on the rear ends of the cover (5). A channel is provided on the cover (5) in order to engage a restoration spring (58) which engages a pivot (16). One end of the restoration spring (58) is engaged with the channel and the other end thereof is within the shell. Therefore, the front lateral side of the cover (5) is urged to spring up. The front portion of the cover (5) is provided with engaging slots (57) such that when the cover (5) is closed, engaging edges (421) of the transverse portion (42) of the T-shaped block (4) engage slots (57) to form a compact sealing. The end portion of the cover (5) is provided with a eye lens (53) and the front portion thereof is pivotally connected with an object lens (52). The lower end of the lens (52) is provided with columns (54) which are respectively slidably disposed within the grooves (11, 21) of the first and second shells (1, 2).

An axle (6) is provided at the lower lateral side of the front portion of the cylindrical structure (3). Several tools, such as a knife (61). A magnifying glass (62) and a screw driver (63), a saw (64), a fork (65), and a bottle opener (66) are pivotally connected with the axle (6) such that those tools can be rotated or kept within the shell. A whistle (7) is engaged at the bottom of the shell.

Figure 3:
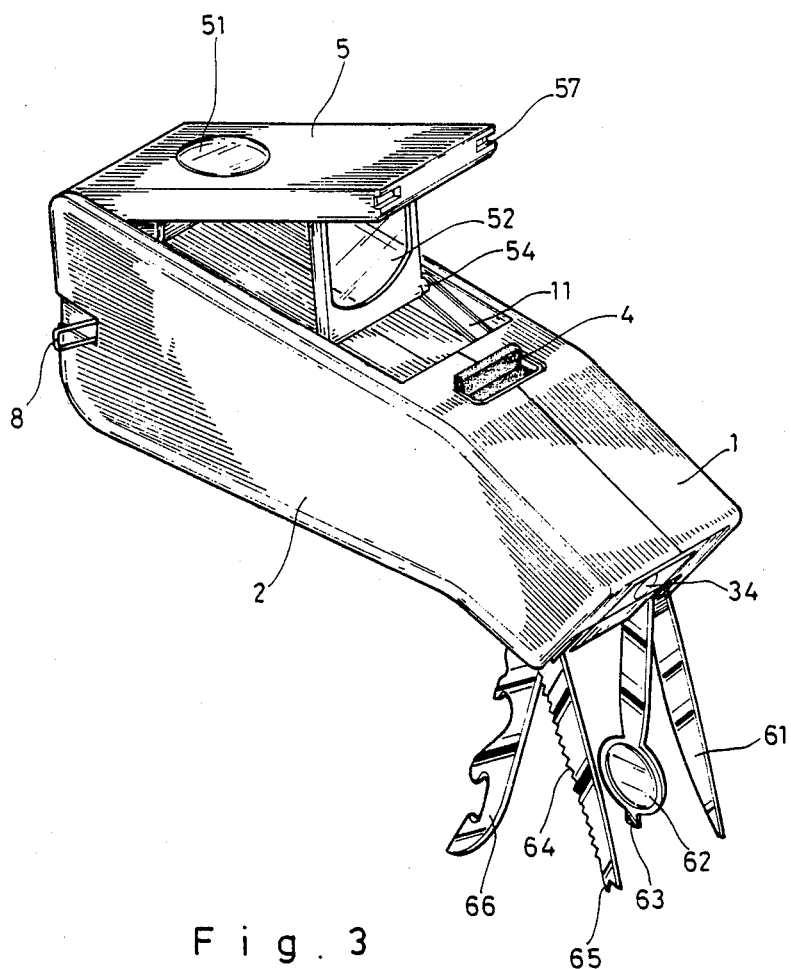
FIG. 3 is a preferred embodiment in accordance with the present invention.

The above structure can be assembled as shown in FIG. 1. When the switch (14) is turned on, a flashlight is provided by this invention. When the T-block (4) is moved forward, the cover (5) can be sprung out as shown in FIG. 3 viewing through the eye lens (53) and the object lens (52), this invention may be used as a telescope. The knife (61), magnifying glass (62), screw driver (63), saw (64), fork (65) and bottle opener (66) can be easily rotated from the device of this invention and the whistle (7) can easily be taken out and applied. Apart from these, a ring (8) is provided in order to hook the present device to a convenient place on the user. Thus the combination of the above device permits the entire individual tool to be used conveniently.

Those skilled in the art will readily recognize that various modification of the portable safety devices of the present invention may be made. Accordingly, the embodiment illustrated and discussed hereinabove should be understood to be exemplary only in nature, and the scope of the instant invention should be limited only by that of the following claims.

I claim:

1. A portable safety device for outdoor use comprising:
    a first and a second shell;
    two grooves respectively disposed in said first and second shells;
    a switch disposed on said first shell and exposed to the outer environment of said first shell;
    first and second conductive plates disposed on said first shell which electrically communicate with each other by said switch;
    a cylindrical lighting means disposed between said first and second shells and one end thereof protruding from the combination of said first and second shells;
    fixing means disposed on the other end of the combination of said first and second shells for connecting said lighting means, and said first and second shells together;
    a telescope movably disposed upon said lighting means and having an open position and a closed position, said telescope having an object lens pivotally engaged thereto and an eye lens connected thereto;
    a slidably elongated means provided on the object lens of said telescope for slidably moving said telescope from said closed position to said open position and two ends thereof respectively sliding on the grooves of said first and second shells;
    engaging means disposed on one end of said telescope which is near the eye lens of said telescope for connecting said telescope with said first and second shells; and
    a T-shaped block disposed near the other end of said telescope which is near the object lens of said telescope for releasing said telescope so that said telescope may move from said closed position to said open position;
    whereby upon the movement of said T-shaped block, said telescope may move from said closed position to said open position.

2. A portable safety device for outdoor use as claimed in claim 1, wherein said fixing means comprising two fixing seats respectively disposed on said first and second shells, a bottom plate, two pegs respectively connected with said fixing seats and a spring disposed on said bottom plate for electrically connecting said cylindrically lighting means with said bottom plate.

3. A portable safety device for outdoor use as claimed in claim 1, wherein said engaging means comprises two engaging holes in said one end of said telescope which are near the eye lens of said telescope, two restoration springs and two pivots disposed on said first and second shells and engaged with said holes through said restoration springs.

4. A portable safety device for outdoor use as claimed in claim 1, further comprising a protrusion disposed on said second shell and a spring provided between said protrusion and said T-shaped switch.

5. A portable safety device for outdoor use as claimed in claim 1, further comprising an axle disposed on one end of said cylindrical lighting means for pivotal connection with utensils.

6. A portable safety device for outdoor use as claimed in claim 5, wherein said utensils include a knife, a magnifying glass, a screw driver, a saw, a fork and a bottle opener.

7. A portable safety device for outdoor use as claimed in claims 1, 2, 3, 4, 5 or 6, further comprising a compass transversely disposed on said telescope.

8. A portable safety device for outdoor use as claimed in claims 1, 2, 3, 4, 5 or 6, further comprising a whistle disposed within the combination of said first and second shells.

9. A portable safety device for outdoor use as claimed in claims 1, 2, 3, 4, 5 or 6, further comprising a hanger disposed on said first shell or said second shell.

* * * * *